(12) United States Patent
Zhu

(10) Patent No.: US 9,456,368 B2
(45) Date of Patent: Sep. 27, 2016

(54) MEASURING LINK PERFORMANCE USING MULTIPLE RADIO ACCESS NETWORKS

(71) Applicant: INTEL CORPORATION, Santa Clara, CA (US)

(72) Inventor: Jing Zhu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 87 days.

(21) Appl. No.: 14/365,492

(22) PCT Filed: Dec. 20, 2013

(86) PCT No.: PCT/US2013/076785
§ 371 (c)(1),
(2) Date: Jun. 13, 2014

(87) PCT Pub. No.: WO2015/094316
PCT Pub. Date: Jun. 25, 2015

(65) Prior Publication Data
US 2015/0215795 A1 Jul. 30, 2015

(51) Int. Cl.
*H04W 88/06* (2009.01)
*H04L 12/26* (2006.01)
*H04W 24/08* (2009.01)

(52) U.S. Cl.
CPC ............ *H04W 24/08* (2013.01); *H04L 43/062* (2013.01); *H04L 43/0876* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,180,876 B1 * | 2/2007 | Henry | H04W 48/18 370/329 |
| 8,718,797 B1 * | 5/2014 | Addepalli | H04W 4/046 700/17 |
| 2002/0039892 A1 * | 4/2002 | Lindell | H04W 48/18 455/151.1 |
| 2004/0077341 A1 * | 4/2004 | Chandranmenon | H04W 36/14 455/418 |
| 2004/0185887 A1 * | 9/2004 | Wolman | H04L 29/06 455/516 |

(Continued)

OTHER PUBLICATIONS

International Search Report and Written Opinion received for PCT Patent Application No. PCT/US2013/076785, mailed on Sep. 19, 2014, 10 pages.

(Continued)

*Primary Examiner* — Ayaz Sheikh
*Assistant Examiner* — Tarell Hampton
(74) *Attorney, Agent, or Firm* — Thorpe North & Western LLP

(57) ABSTRACT

Technology for measuring link performance using multiple radio access networks (RANs) is described. Data packets of a flow can be received, at a mobile node via a first connection with the mobile node with a first RAN. An active measurement can be initiated when a Real-time Traffic Flow Measurement (RTFM) triggering condition occurs. A second connection can be formed with the mobile node with a second RAN. Selected packets of the flow can be received for the active measurement using the first RAN and using the second RAN. An RTFM execution event can be communicated to a virtual access network (VAN) to move the flow from the first RAN to the second RAN when the active measurement of the selected packets is received via the second RAN is greater than a selected threshold value.

30 Claims, 12 Drawing Sheets

(56) References Cited

U.S. PATENT DOCUMENTS

| | | | |
|---|---|---|---|
| 2005/0266880 A1* | 12/2005 | Gupta | H04W 88/06 455/557 |
| 2006/0146748 A1* | 7/2006 | Ng | H04L 12/5692 370/331 |
| 2006/0193295 A1* | 8/2006 | White | H04L 12/5692 370/336 |
| 2006/0268928 A1* | 11/2006 | Barzegar | H04W 36/14 370/465 |
| 2007/0030826 A1* | 2/2007 | Zhang | H04L 29/06027 370/331 |
| 2007/0073887 A1* | 3/2007 | Prasad | H04W 4/003 709/227 |
| 2007/0217349 A1* | 9/2007 | Fodor | H04L 12/5692 370/310.2 |
| 2008/0192681 A1* | 8/2008 | Lee | H04W 48/18 370/328 |
| 2008/0298313 A1* | 12/2008 | Salminen | H04L 63/08 370/329 |
| 2009/0003294 A1 | 1/2009 | Zhu et al. | |
| 2009/0109925 A1* | 4/2009 | Nakamura | H04L 63/062 370/331 |
| 2009/0129275 A1* | 5/2009 | Watanabe | H04L 12/46 370/235 |
| 2010/0022243 A1* | 1/2010 | Oommen | H04W 48/18 455/435.3 |
| 2010/0115083 A1* | 5/2010 | Oba | H04W 36/30 709/224 |
| 2010/0165959 A1 | 7/2010 | Park et al. | |
| 2010/0265856 A1 | 10/2010 | Yang | |
| 2011/0044218 A1* | 2/2011 | Kaur | H04W 76/026 370/310 |
| 2012/0106528 A1* | 5/2012 | Estevez | H04W 88/06 370/338 |
| 2012/0289285 A1 | 11/2012 | Clevorn et al. | |
| 2012/0322504 A1* | 12/2012 | Chou | H04W 36/14 455/558 |
| 2013/0055347 A1* | 2/2013 | Chawla | H04W 12/08 726/3 |
| 2013/0078994 A1* | 3/2013 | Jouin | G06F 3/1438 455/426.1 |
| 2013/0132604 A1* | 5/2013 | Cohen | H04W 76/025 709/231 |
| 2013/0163450 A1 | 6/2013 | Kreuchauf et al. | |
| 2014/0073287 A1* | 3/2014 | Zhang | H04W 48/20 455/411 |
| 2015/0117301 A1* | 4/2015 | Manapragada | H04W 16/26 370/315 |

OTHER PUBLICATIONS

3GPP TS 23.261, "Technical Specification Group Services and System Aspects; IP flow mobility and seamless Wireless Local Area Network (WLAN) offload", 3rd Generation Partnership Project, Stage 2, Release 11, V11.0.0, Sep. 2012, 22 pages.

* cited by examiner

MEASURING LINK PERFORMANCE USING MULTIPLE RADIO ACCESS NETWORKS

CROSS-REFERENCING TO RELATED APPLICATIONS

The present application is claiming priority from pending PCT Patent Application No. PCT/US2013/076785, filed on Dec. 20, 2013, entitled "MEASURING LINK PERFORMANCE USING MULTIPLE RADIO ACCESS NETWORKS".

BACKGROUND

Mobile device users often use their devices to receive multimedia content such as streaming audio, video, or data, from a communications node. Mobile computing devices, such as laptops, smartphones, ultrabooks, or tablets are increasingly equipped with multiple transceivers that support different Radio Access Networks (RANs), such as Wi-Fi and cellular transceivers. Likewise, it is not uncommon to find overlapping coverage between multiple RANs that may operate at different bandwidths. Mobile devices equipped with multiple transceivers are able to access the different RAN networks to communicate content.

However, various RATs often operate independently in wireless-enabled communications environments. For example, a user of a multi-radio mobile device or user equipment (UE) may selectively elect to operate either in a Wi-Fi mode or in a cellular mode. Alternatively, the device may automatically elect for the user. While a selected radio link can provide a user with a smooth experience for some types of applications such as delay-sensitive applications, it is not uncommon to experience outages, manifested by dropped calls, buffering delays, transmission errors, and slow connections.

Virtual access network (VAN) technologies allow seamless end-to-end integration of multiple heterogeneous radio access networks (RANs) and enable advanced multi-radio resource management. However, it can be difficult for a VAN to effectively compare the availability and throughput of different RATs.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
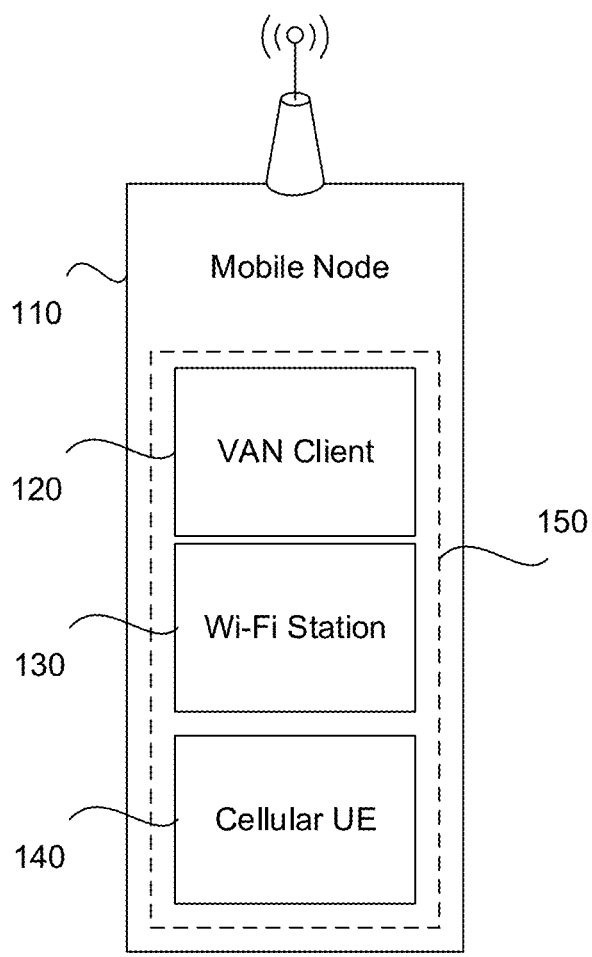
FIG. 1 depicts a Real-time Traffic Flow Measurement (RTFM) monitor in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Virtual Access Network (VAN) technologies allows seamless end-to-end integration of multiple heterogeneous radio access networks (RANs) and enable advanced multi-radio resource management techniques, such as seamless offload, flow mobility, bandwidth aggregation, and load balancing in a mobile device, such as a user equipment (UE) or a mobile station (MS). A RAN operates on a specified radio frequency band, such as a Wi-Fi, 3GPP Cellular, etc.

While the term UE, which is typically associated with the third generation partnership project (3GPP) specification, is used throughout the application, it is not intended to be limiting. Other types of wireless wide area network (WWAN) cellular technologies can also be used in accordance with embodiments of the present invention, including the institute of electrical and electronics engineers (IEEE) 802.16 specification, commonly referred to as WiMAX. Other wireless local area network (WLAN) RATs which can be used in embodiments of the present invention include, but are not limited to, the IEEE 802.11 (WiFi), IEEE 802.15, and Bluetooth specifications.

As a UE seeks to access a radio access network, the UE can select the type of network or RAN, such as a WLAN Wi-Fi or cellular network to use to communicate and access data. In one embodiment, an example of data as multi-media content is provided to illustrate delay sensitive data that needs to be received in a timely manner. However, any type of data may be accessed by the UE. To maintain a connection or to maintain a desired flow of data when delay sensitive or low-latency data such as multi-media content is accessed, a Real-time Traffic Flow Measurement (RTFM) can be monitored.

RTFM provides reporting information about traffic flows on the Internet. RTFM can be used to measure traffic in three broad areas, including clients and servers, network segments, and mesh networks. RTFM may be advantageous in situations where low-latency Internet applications are used, such as video conferencing, live media streaming, or other types of low-latency applications. The flow mobility may be monitored by an RTFM monitor.

FIG. 1 illustrates one embodiment of a mobile node 110 containing an RTFM monitor 150. The RTFM monitor 150 can be included in the mobile node. In addition, a VAN client 120, a WLAN radio 130, and a cellular radio 140 can be co-located in the mobile node 110. In another embodiment, the RTFM monitor 150 can be located in at least one of the VAN client 120, a WLAN radio 130, or a cellular radio 140. In one embodiment, the RTFM monitor 150 is configured to monitor relevant traffic flows of the WLAN RAN and the cellular RAN to aid in determining which RAN the mobile node should use.

In one embodiment, an RTFM monitor is configured to monitor the packet flow of a network. In one embodiment, packet flow is an ordered set of packets traveling through the network in a given direction, close in time. A packet flow may be comprised of packets with characteristics in common, such as: source internet protocol (IP) addresses; destination internet protocol (IP) addresses; transport protocols, such as TCP or UDP; source ports; and/or destination ports.

An access network can be a client-server based network in which the server provides an IPv4 (v6) address to the client for Internet access.

Figure 2:
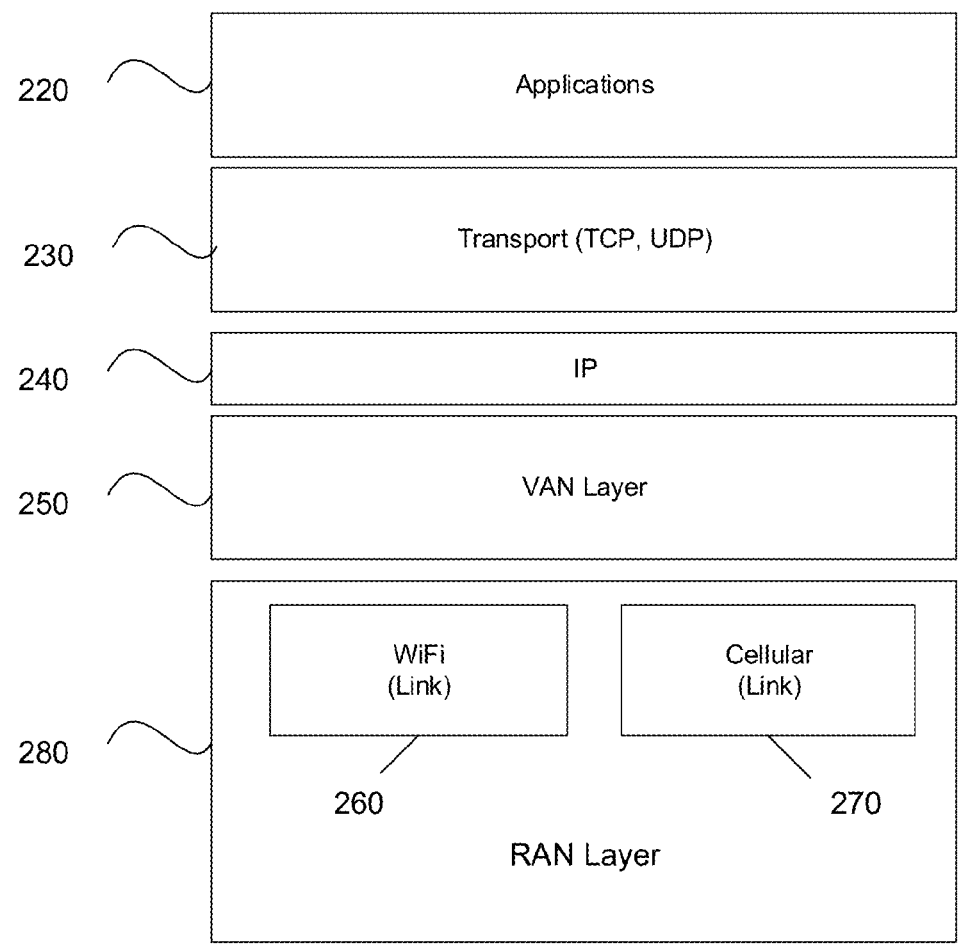
FIG. 2 depicts an integrated multi-radio access network (RAN) protocol stack in accordance with an example.

FIG. 2 illustrates one embodiment of an integrated multi-RAN protocol stack 210. In one embodiment the integrated multi-RAN protocol stack 210 comprises an applications layer 220, a transport layer 230 such as transmission control protocol (TCP) or a user datagram protocol (UDP), an internet protocol (IP) layer 240, a VAN layer 250, and a RAN layer 280. In one embodiment, the RAN layer 280 comprises a WLAN link, such as a wireless fidelity (Wi-Fi) link 260 and a cellular link 270.

Figure 3A:
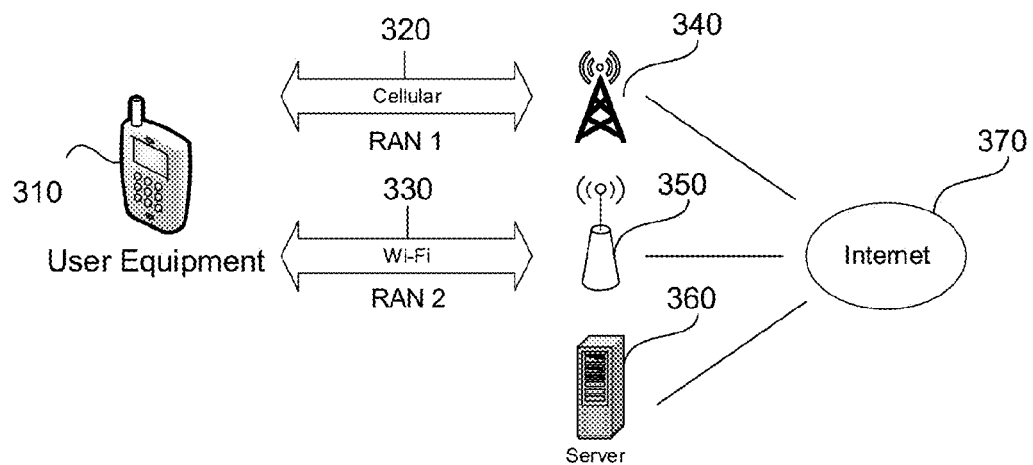
FIGS. 3a and 3b illustrate embodiments of an integrated multi-RAN architectures in accordance with an example.
Figure 3B:
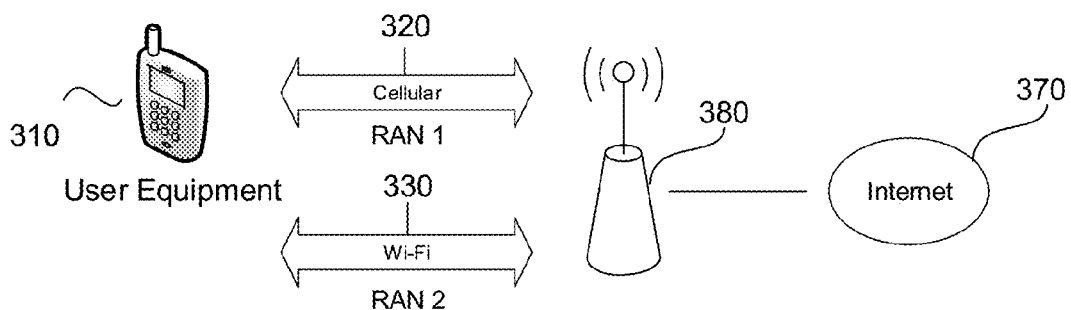

FIGS. 3a and 3b illustrate embodiments of an integrated multi-RAN architecture. Multi-radio network selection and flow mobility decisions can be made by a VAN client operating on a UE 310. In FIG. 3a the UE 310 can connect to the internet 370 via a cellular RAN connection, RAN 1 320, to a cellular base station (BS) 340. The UE 310 can use RAN 2 330, such as a WiFi connection, to connect to the internet via a Wi-Fi access point (AP) 350.

FIG. 3a further illustrates that in one embodiment a VAN server 360 may not be co-located with the Wi-Fi AP 350 and the cellular BS 340. In another embodiment as illustrated in FIG. 3b, the VAN server, Wi-Fi AP, and the cellular BS can be collocated at a node 380.

In one embodiment, a Virtual Access Network (VAN) may be an access network that operates Over-The-Top of one or multiple RANs using the tunneling protocols such as Mobile IP or virtual private network (VPN). In another embodiment, a VAN may operate over multiple RANs directly.

In one embodiment, a client centric RTFM monitoring method can consist of two steps. Step 1 involves passively measuring the packet flow of a selected RAN. Step 2 includes actively measuring the packet flow of the selected RAN and another selected RAN.

At Step 1, a receiver can conduct a passive data flow measurement using data packets without any additional overhead. The receiver can set RTFM active measurement triggering conditions to determine when to move to Step 2. In one embodiment, the triggering events can include a receive timeout event, a low throughput event, and/or a periodic timer expiry event. In one embodiment, the receive timeout event can occur when no packet(s) of a data flow arrive within a defined or selected period of time. For example, if no packets arrive within 1 ms to 500 ms of time, then a receive timeout event can be registered. In another embodiment, the low throughput event can occur when the average receiving throughput of the data flow is lower than a defined or selected threshold. In one embodiment, the low throughput event is measured in kilobits per second (kbps) or megabits per second (mbps). The actual throughput threshold can depend on the RAN and system requirements. For instance, a high throughput cellular RAN, such as a 3GPP long term evolution (LTE) RAN may have a relatively high threshold, such as 500 kbps. A RAN such as Bluetooth may have a lower threshold, such as 10 kbps. In one embodiment, the periodic timer expiry event occurs when a defined or selected period of time expires. The amount of time can be system dependent. In an example, the defined time period can be between several milliseconds and several minutes.

In one embodiment, if any RTFM active measurement triggering condition occurs, Step 2 will start. At Step 2 the sender will send packets of the flow over both a serving RAN and a new RAN for the purpose of active measurement. In another embodiment, the sender will send packets of the flow over multiple RANs. The packets sent over the serving RAN, new RAN, and/or multiple RANs can be actively measured to determine which RAN performs better for the flow. Which RAN performs better for a flow may be dependent on system requirements and the type of flow. Flow criteria can include packet delay, packet loss, and packet throughput. In one embodiment, the same packets can be sent and actively measured over each RAN to enable the performance (e.g. delay, loss, throughput) to be compared. The measurements can be compiled at the VAN, such as at a VAN server that is in communication with each RAN.

In one embodiment, the sender can proactively drop packets to reduce traffic load and overhead. For a data flow in an active measurement, each packet in the data flow can be sent over both networks. In one embodiment, all traffic in the data flow can be sent over both RANs. However, WWAN technologies such as cellular can have a lower throughput than WLAN technologies such as WiFi. To accommodate the different throughput rates of the different RANs, the active measurements can be performed with by sending a subset of the data. For example, the low priority packets sent on the RAN with the lower throughput can be proactively dropped. To detect performance issues, to be conservative, in the active measurement state only high priority packets may be used. The number of packets sent in an active test can vary based on network design or network type. The number of packets in the active test may vary between tens of packets to hundreds or thousands of packets, depending on the type of test performed—such as a timed test, a packet loss, test, or other type of test.

Whether a packet is dropped is based on the packets relative priority to others packets in the flow, e.g. intra-flow priority. For example, for an internet video call the sender may drop video packets to give audio packets higher priority.

In one embodiment, a new bit field S is added to a header data packet. In one embodiment, when Step 2 is initiated, the new bit field S indicates that a data packet is being sent over multiple networks and can be used by the receiver for active measurement. In one embodiment, a receiver will measure when to return to Step 1 based on the packet(s) sent over both networks. The active measurement may be measured using selected parameters. For example, in one embodiment one or more of the following parameters may be used to actively measure data packets sent over the new RAN: time (t), winning packet count (c), winning packet delay count (d), winning packet loss count (p), winning packet count threshold ($C_{th}$), winning packet delay threshold ($D_{th}$), winning packet loss threshold ($P_{th}$), and/or maximum active measurement duration ($T_{th}$). In one embodiment, the winning packet count, winning packet delay count, and wining packet loss count are each initially set to zero.

In one embodiment the active measurement can be computed as follows:

If a copy of a packet sent over a new RAN arrives earlier in time (t): c=c+1 and d=d+t. In one example, t may be measured in units of time such as millisecond, second, minutes, or other units of time. In one example, c is measured in the number of packets that do or do not arrive first. In one example, d is measured in the number of packets that are or are not delayed.

If the copy of the packet sent over a serving RAN arrives earlier in time: c=c−1 and d=d−t.

If the copy of the packet sent over the new RAN arrives, but the copy sent over the serving RAN is lost: c=c+1 and p=p+1. In one example, p is measured in the number of packets that are or are not lost.

If the copy of the packet sent over the serving RAN arrives, but the copy sent over the new RAN is lost: c=c−1 and p=p−1.

In one embodiment, if $c>C_{th}$ and $d>D_{th}$ and $p>P_{th}$ then an RTFM Execution is triggered, Step 2 ends, the real-time flow will be moved to the new RAN, and Step 1 restarts. In one example, $C_{th}$ is a threshold for the number of packets that arrive first. In one example, $D_{th}$ is a threshold for the number of packets that are delayed. In one example, $P_{th}$ is a threshold for the number of packets that are lost.

In another embodiment, if $c>C_{th}$ or $d>D_{th}$ or $p>P_{th}$ then an RTFM Execution is triggered, Step 2 ends, the real-time flow will be moved to the new RAN, and Step 1 restarts. In one embodiment, the winning packet count threshold, winning packet delay threshold, winning packet loss threshold, e.g. ($C_{th}$, $D_{th}$, $P_{th}$) may each be set differently depending on whether the serving RAN is a Wi-Fi RAN or Cellular RAN. In one embodiment, when Step 2 ends then Step 1 restarts.

In one embodiment, if $c<C_{th}$ and $d<D_{th}$ and $p<P_{th}$ then an RTFM Execution is triggered, Step 2 ends, the real-time flow will remain with the serving RAN, and Step 1 restarts. In one example, $C_{th}$ is a threshold for the number of packets that arrive first. In one example, $D_{th}$ is a threshold for the number of packets that are delayed. In one example, $P_{th}$ is a threshold for the number of packets that are lost.

In another embodiment, if $c<C_{th}$ or $d<D_{th}$ or $p<P_{th}$ then an RTFM Execution is triggered, Step 2 ends, the real-time flow will remain with the serving RAN, and Step 1 restarts. In one embodiment, the winning packet count threshold, winning packet delay threshold, winning packet loss threshold, e.g. ($C_{th}$, $D_{th}$, $P_{th}$) may each be set differently depending on whether the serving RAN is a WLAN RAN or a WWAN (cellular) RAN. In one embodiment, when Step 2 ends then Step 1 restarts.

In one embodiment, if the maximum active measurement duration ($T_{th}$) is reached, the real-time flow will stay in the current serving RAN, Step 2 ends, and Step 1 restarts.

Figure 4:
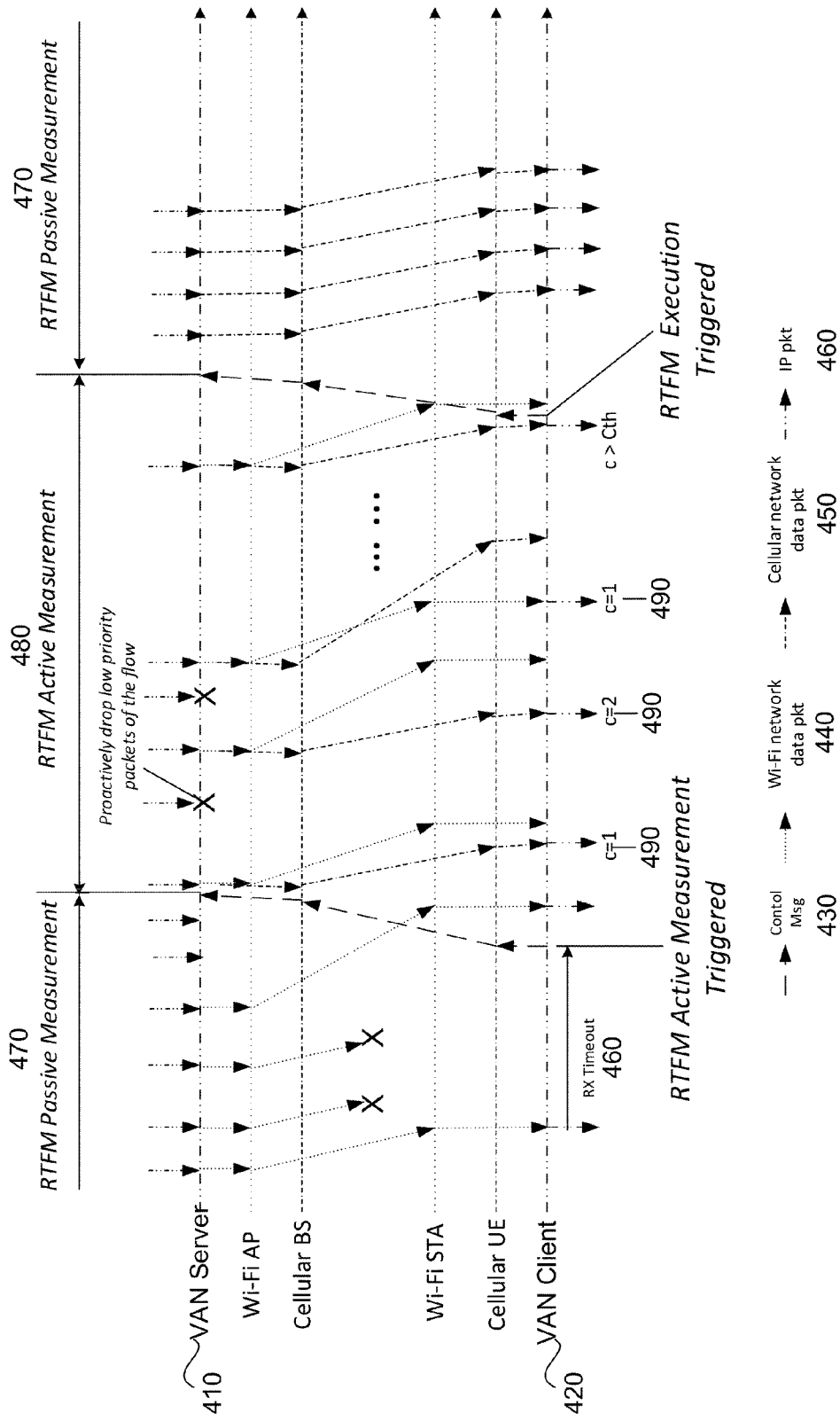
FIG. 4 illustrates the work flow of a downlink RTFM in accordance with an example.

FIG. 4 illustrates the work flow of a downlink RTFM. Initially, the VAN server 410 communicates with a VAN client 420 via a Wi-Fi connection 440 during an RTFM passive measurement 470. After a period of time, the VAN client 420 does not receive packets from the VAN server 410 via the Wi-Fi connection 440 and a receive (RX) Timeout Event 460 is triggered. When the RX Timeout Event 460 is triggered the VAN client 420 can send a control message 430 to the VAN server 410 to notify the VAN server 410 to initiate step 2, e.g. start an RTFM active measurement 480.

In one embodiment, during the RTFM active measurement 480, the VAN server 410 proactively drops low priority packets of the flow to reduce traffic load, and sends high priority Wi-Fi packets 440 and cellular packets 450 over a cellular network connection and a Wi-Fi network connection.

In one embodiment, the VAN client 420 can receive high priority Wi-Fi packets 440 and cellular packets 450 from the cellular network connection and a Wi-Fi network connection. During the RTFM active measurement period 480 where the VAN client 420 is receiving high priority Wi-Fi packets 440 and cellular packets 450 from the Wi-Fi network connection and a cellular network connection, the VAN client 420 can use a packet counter to keep a packet count 490.

The packet counter can increase the packet count 490 for each data packet received from the cellular network connection before receiving a data packet from the Wi-Fi network connection, e.g. current packet count=previous packet count−1. The current packet count may be represented as $c_c$ and the previous packet count as $c_p$. The packet counter can decrease the packet count 490 for each data packet received from the Wi-Fi network 440 before receiving a data packet from the cellular network 450, e.g. $c_c=c_p-1$.

The VAN 420 client can iteratively update the packet counter 490. When current packet count is greater than a defined or selected packet count threshold ($C_{th}$), e.g. $c_c>C_{th}$, RTFM Execution is triggered. When the RTFM Execution is triggered, the VAN client 420 can send a control message 430 to the VAN server 410 to move the data packet flow from the serving RAN (Wi-Fi) to the new RAN (cellular). In another embodiment, the data packet flow can be moved from a cellular network to a Wi-Fi network based on the RTFM measurements.

In another embodiment, the workflow as illustrated in FIG. 4 may be applied to an uplink RTFM.

Figure 5:
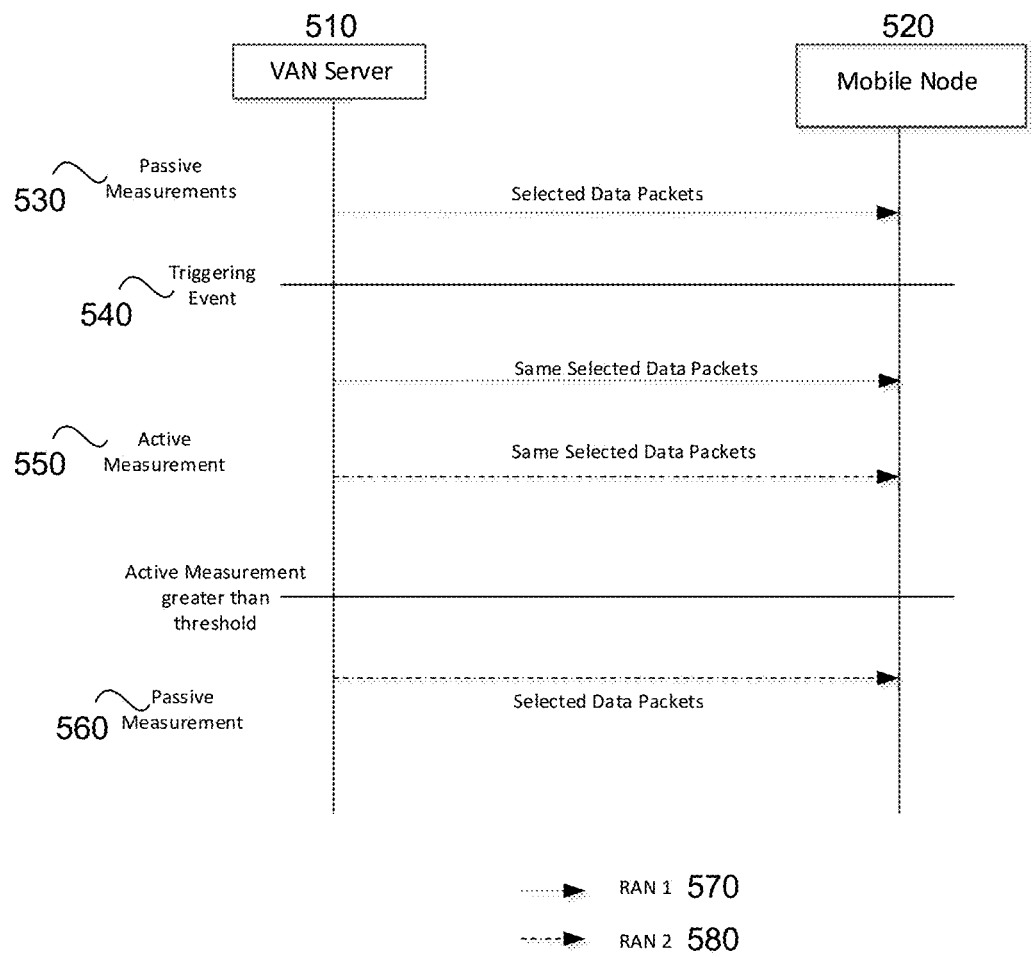
FIGS. 5 and 6 depicts a diagram of a VAN Server communicating with a mobile node during the passive and active measurements in accordance with an example.

FIG. 5 shows a diagram of a VAN Server 510 communicating with a Mobile node 520 during the passive measurement 530 and 560 and active measurement 550. In one embodiment, during the passive measurement 530, the VAN server 510 can communicate selected data packets to a mobile node 520 using a using RAN 1 570. As previously discussed, the mobile node may be a UE, an MS, or another type of wireless device with multiple RATs. In one embodiment, a triggering event 540 occurs and an active measurement 550 is taken. In one embodiment, during the active measurement 550, the VAN server 510 communicates selected data packets to the mobile node 520 using RAN 1 570 and the VAN server 510 communicates substantially the same selected data packets to the mobile node 520 using RAN 2 580. In one embodiment, if during the active measurement, the number of selected packets received via RAN 2 580 is greater than a selected threshold value, the VAN server 510 can move the flow from RAN 1 570 to RAN 2 580. As previously mentioned, RAN 1 can be a WLAN technology and RAN 2 can be a WWAN technology, or vice versa.

The ability of the VAN to communicate the same packets across both RAN 1 570 and RAN 2 580 during the active measurement enables the performance of RAN 1 570 and RAN 2 580 to be accurately measured and compared, thereby enabling the data flow to be maximized on the different RATs.

Figure 6:
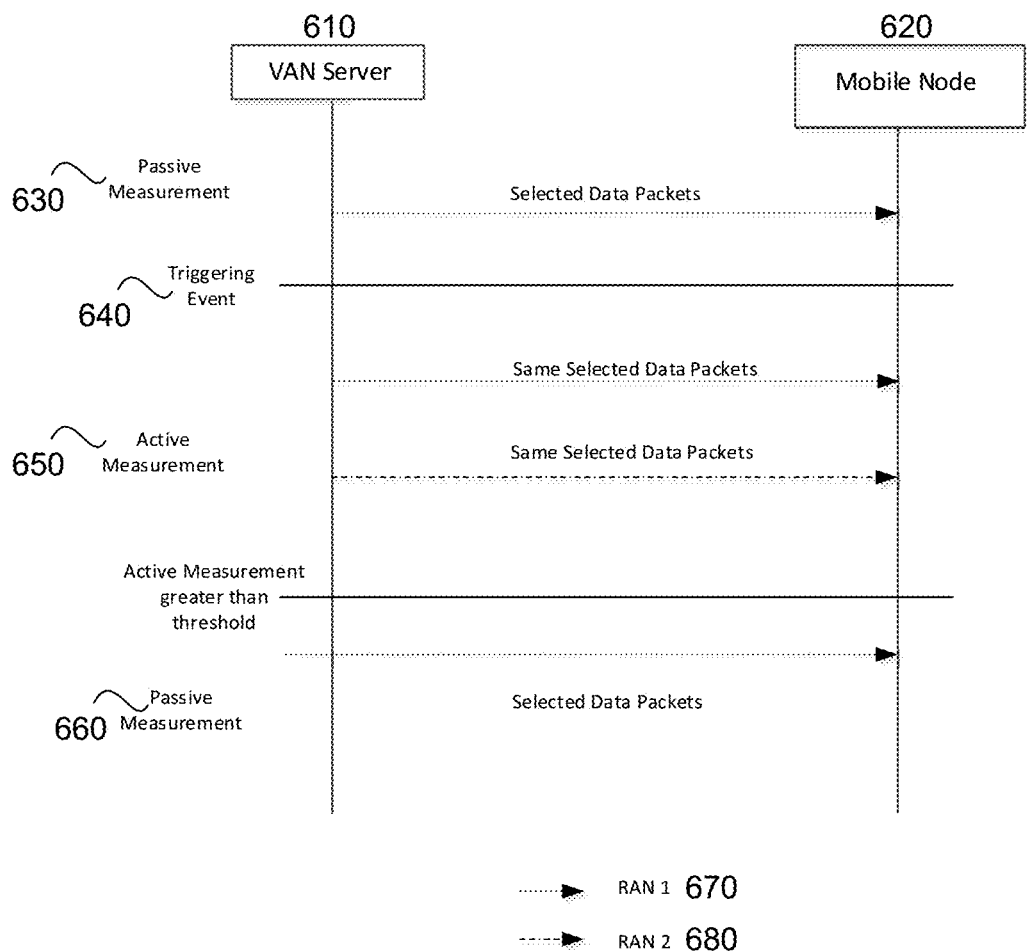

FIG. 6 shows a diagram of a VAN Server 610 communicating with a mobile node 620 during passive measurement 630 and 660 and active measurement 650. In one embodiment, during the passive measurement 630, the VAN server 610 can communicate selected data packets to the mobile node 620 using RAN 1 670. In one embodiment, a triggering event 640 occurs and active measurement 650 is taken. In one embodiment, during the active measurement 650, the VAN server 610 can communicate substantially the same selected data packets to the mobile node 620 using a using RAN 1 670 and the VAN server 610 can communicate selected data packets to the mobile node 620 using a using RAN 2 680. In one embodiment, if during the active measurement, the selected packets received via RAN 2 680 are less than a selected threshold value, the VAN server 610 can keep the flow at RAN 1 680.

Figure 7:
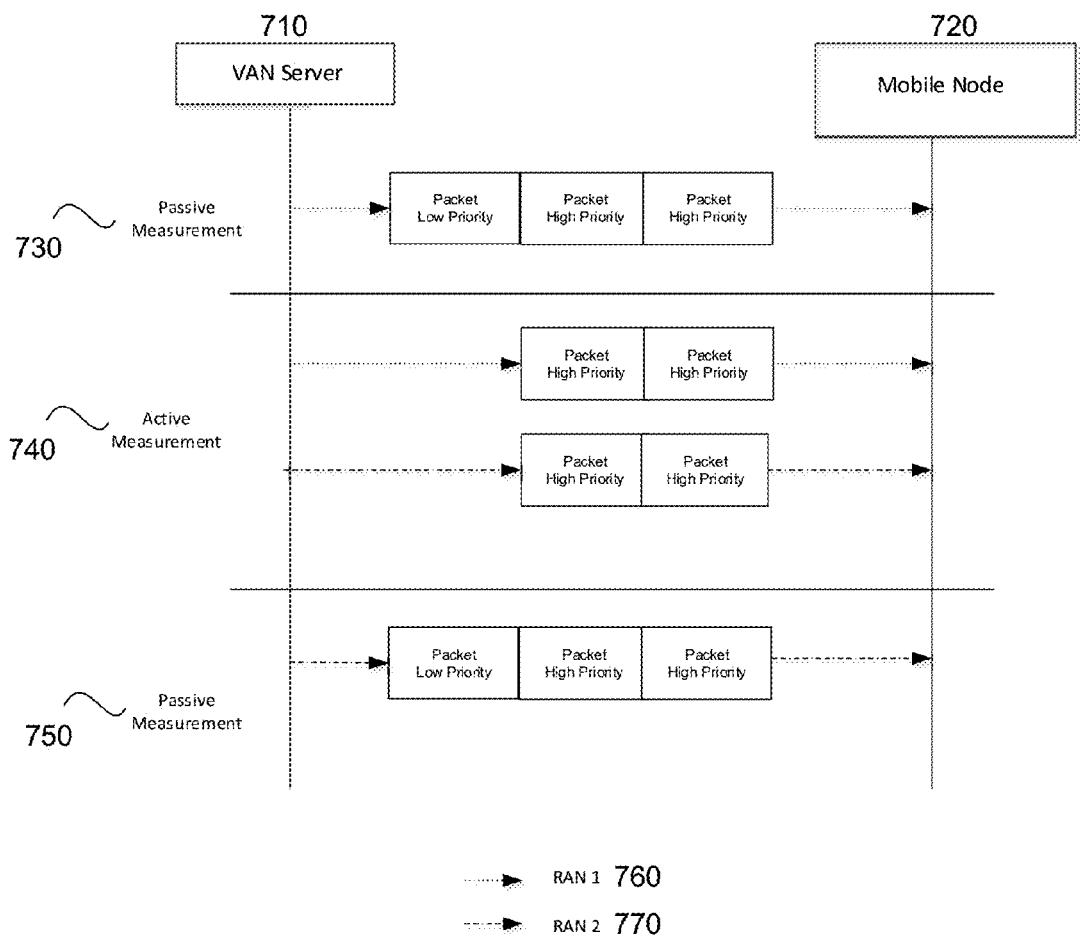
FIG. 7 depicts a diagram of a VAN server communicating data packets of low and high priority to a mobile node in accordance with an example.

FIG. 7 shows one embodiment, where the VAN server 710 may proactively drop packets to reduce traffic load and overhead in an active measurement for a RAN with a lower throughput. In FIG. 7, during the passive measurement 730, data packets of both low and high priority are communicated from the VAN server 710 to the mobile node 720 via a first RAN 760. FIG. 7 shows one embodiment, where during active measurement 740, the VAN server 710 drops data packets of low priority based on the data packets relative priority to others data packets in the flow, e.g. intra-flow priority, and communicates data packets of high priority from the VAN server 710 to the mobile node 720 via the first RAN 760 and a second RAN 770. In FIG. 7, during the passive measurement 750, data packets of both low and high priority are again communicated from the VAN server 710 to the mobile node 720 via first RAN 760. In another embodiment, during the passive measurement 750, data packets of both low and high priority are moved over and communicated from the VAN server 710 to the mobile node 720 via second RAN 770.

Figure 8:
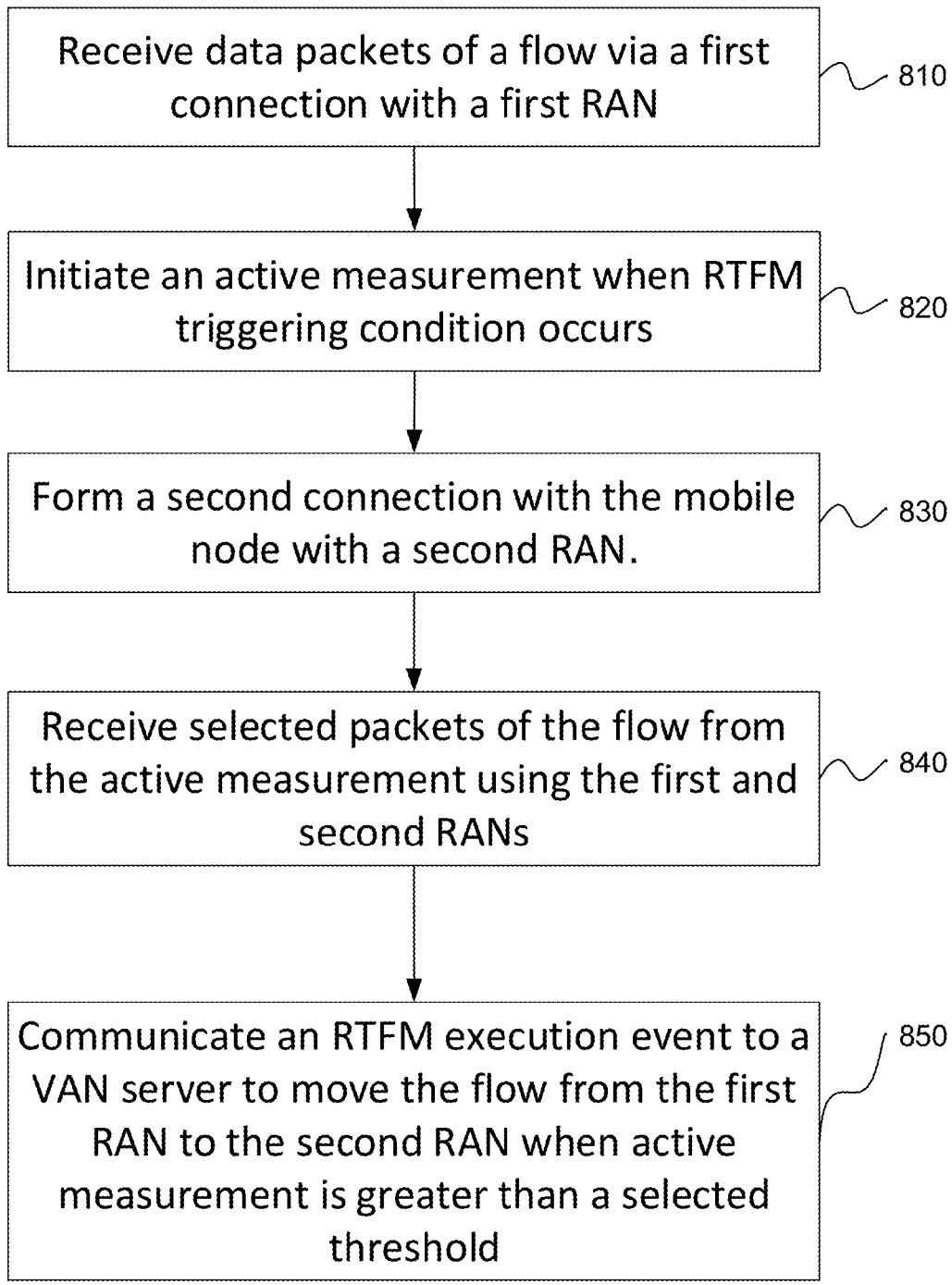
FIG. 8 depicts functionality of computer circuitry of mobile node for measuring link performance using multiple radio access networks (RANs) in accordance with an example in accordance with an example.

FIG. 8 uses a flow chart to illustrate the functionality of one embodiment of the of the computer circuitry of a mobile node for measuring link performance using multiple RATs. The functionality may be implemented as a method or the functionality may be executed as instructions on a machine, where the instructions are included on at least one computer readable medium or one non-transitory machine readable storage medium.

The computer circuitry can be configured to receive data packets of a flow at the mobile node via a first connection with the mobile node with a first RAN, as in block 810. The computer circuitry can be further configured to initiate an active measurement when a Real-time Traffic Flow Measurement (RTFM) triggering condition occurs, as in block 820. The computer circuitry can also be configured to form a second connection with the mobile node with a second RAN, as in block 830. The computer circuitry can be further configured to receive selected packets of the flow for the active measurement using the first RAN and the selected packets of the flow using the second RAN, as in block 840. The computer circuitry can be further configured to communicate an RTFM execution event to a VAN server to move the flow from the first RAN to the second RAN when the active measurement of the selected packets received via the second RAN is greater than a selected threshold value, as in block 850.

In one embodiment, the computer circuitry can be further configured to continue communicating the flow on the first RAN when the active measurement is less than the selected threshold value. In another embodiment, the RTFM triggering conditions include: non-receipt of packets of the flow from the first RAN within a defined threshold of time; an average receiving throughput of the flow of the first RAN is lower than a defined throughput threshold; an expiration of a defined period of time; or a packet loss of a flow from the first RAN that is greater than a defined threshold. In one embodiment, the RTFM execution event is determined by iteratively increasing a packet counter for each packet received from the second RAN before the receipt of the packet from the first RAN and iteratively decreasing the packet counter for each packet received from the first RAN before the receipt of the packet from the second RAN.

In one embodiment, the data packets of the flow from the first RAN include a bit field to indicate that the computer circuitry will receive packets from the first RAN and the second RAN for the active measurement. The bit field can be added to a packet header to indicate if a data packet was received over both the connection with the first RAN and the connection with the second RAN. In another embodiment, the computer circuitry can be further configured to send a control message to the VAN server including an RTFM active measurement parameters and RTFM trigger event notifications. In one embodiment, the computer circuitry can be further configured to send a control message to the VAN server that is incorporated into a virtual access network or is a new message. In another embodiment, the computer circuitry can be further configured to determine when to begin an active measurement based on RTFM triggering conditions. In another embodiment, the computer circuitry can be further configured to determine if an RTFM execution event has been triggered based on: the arrival time of the packets from the first RAN and the second RAN; the delay between the arrival of each packet from the first RAN and the delay between the arrival of each packet from the second RAN; or the number of packets received over a period of time. In another embodiment, the mobile node can further comprise of a virtual access network (VAN) client, a wireless fidelity (Wi-Fi) station, or a third generation partnership project (3GPP) long term evolution (LTE) radio, Release 8, 9, 10 or 11.

Figure 9:
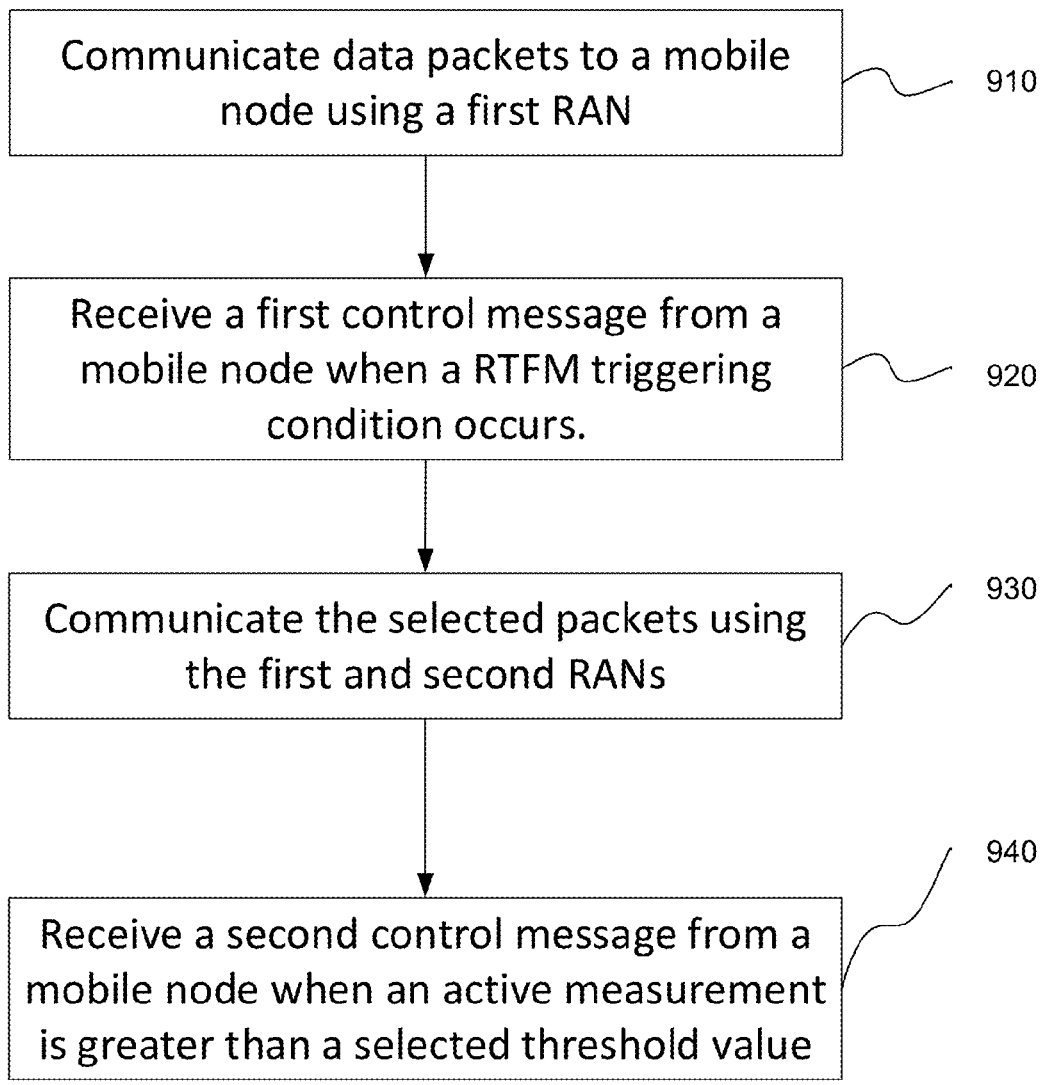
FIG. 9 depicts functionality of computer circuitry a VAN server for measuring link performance using multiple RAN in accordance with an example in accordance with an example.

FIG. 9 uses a flow chart to illustrate the functionality of one embodiment of the computer circuitry of a VAN server for measuring performance link performance using multiple RATs. The functionality may be implemented as a method or the functionality may be executed as instructions on a machine, where the instructions are included on at least one computer readable medium or one non-transitory machine readable storage medium.

The computer circuitry can be configured to communicate data packets to a mobile node using a first RAN, as in block 910. The computer circuitry can be further configured to receive a first control message from the mobile node to send selected data packets using the first RAN and send the selected packets using a second RAN when a Real-time Traffic Flow Measurement (RTFM) triggering condition occurs, as in block 920. The computer circuitry can also be configured to communicate, to the mobile node, the selected packets using the first RAN and the selected packets using the second RAN, as in block 930. The computer circuitry can be further configured to receive a second control message to communicate data packets using the second RAN when an active measurement is greater than a selected threshold value, as in block 940.

In one embodiment, the computer circuitry can be further configured to continue communicating data packets using the first RAN when the active measurement is less than the selected threshold value. In another embodiment, the computer circuitry can be further configured to select data packets communicated using the first RAN and select data packets communicated using the second RAN based on an intra-flow priority. In another embodiment, the computer circuitry can be further configured to determine the intra-flow priority based on the priority of a first data packet communicated using the first RAN relative to the priority of a second data packet communicated using the first RAN. In another embodiment, the computer circuitry can be further configured to determine the intra-flow priority based on the priority of a first data packet communicated using the second RAN relative to the priority of a second data packet communicated using the second RAN.

In one embodiment, the first control message can include RTFM active measurement parameters and RTFM trigger event notifications. The RTFM active measurement parameters can include non-receipt of packets communicated using the first RAN within a defined threshold of time, an average receiving throughput of packets communicated using the first RAN is lower than a defined throughput threshold, an expiration of a defined period of time, or a packet loss of packets communicated using the first RAN that is greater than a defined threshold. In another embodiment, the second control message can include RTFM active measurement parameters and RTFM trigger event notifications. In another embodiment the RTFM active measurement parameters can include: non-receipt of packets communicated using the first RAN within a defined threshold of time; an average receiving throughput of packets communicated using the first RAN is lower than a defined throughput threshold; an expiration of a defined period of time; or a packet loss of packets communicated using the first RAN that is greater than a defined threshold.

In one embodiment, the computer circuitry can be further configured for use with downlink or uplink communications. In another embodiment the data packets can include a new bit field in a data packet header. In another embodiment, the new bit field indicates when each data packet has been sent using the first RAN and the second RAN.

Figure 10:
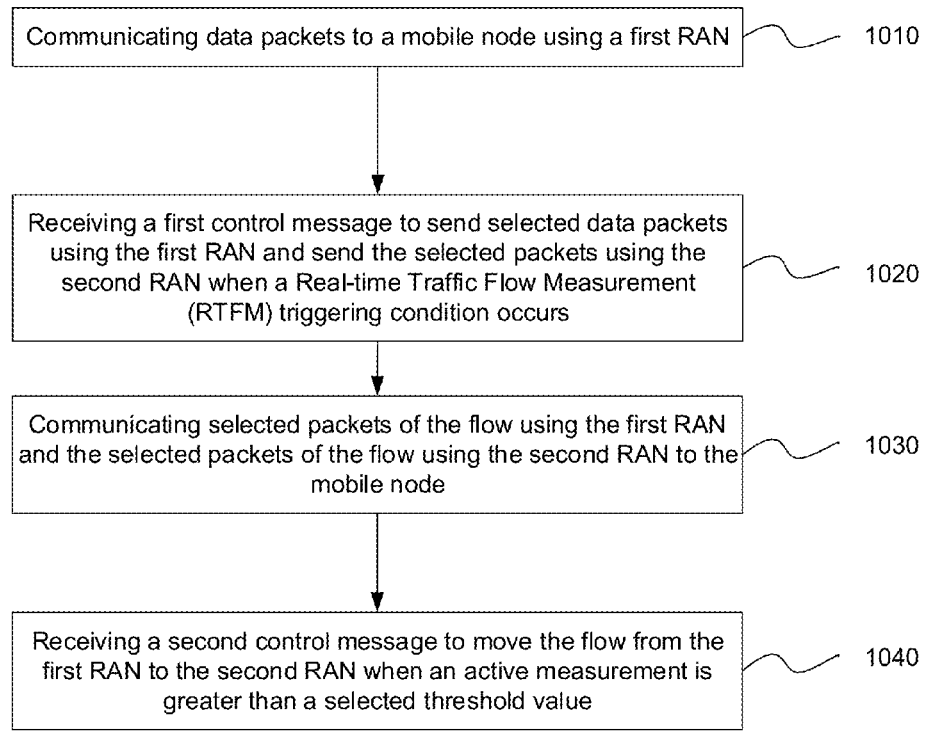
FIG. 10 illustrates a method for measuring link performance using multiple RAN in accordance with an example in accordance with an example.

FIG. 10 uses a flow chart to illustrate a method for measuring link performance using multiple radio access networks (RANs). The method can comprise communicating data packets to a mobile node using a first RAN, as in block 1010. The method can further comprise receiving a first control message to send selected data packets using the first RAN and send the selected packets using the second RAN when a Real-time Traffic Flow Measurement (RTFM) triggering condition occurs, as in block 1020. The method can also comprise communicating selected packets of the flow using the first RAN and the selected packets of the flow using the second RAN to the mobile node, as in block 1030. The method can be further comprise receiving a second control message to move the flow from the first RAN to the second RAN when an active measurement is greater than a selected threshold value, as in block 1040.

In one embodiment, the method can further comprise continuing communicating data packets using the first RAN when the active measurement is less than the selected threshold value. In another embodiment, the method can further comprise communicating the selected data packets to the mobile node using the first RAN and the second RAN from a VAN server or an eNB. In another embodiment, the method can further comprise communicating selected high priority packets of the flow using the first RAN and the selected high priority packets of the flow using the second RAN to the mobile node. In another embodiment, the method can further comprise terminating communicated selected low priority packets of the flow using the first RAN and the selected low priority packets of the flow using the second RAN to the mobile node. the data packet priority of the flow from the first RAN and the data packet priority of the flow from the second RAN can be selected based on an intra-flow priority. The selected low priority packets of the flow using the first RAN and the selected low priority packets of the flow using the second RAN can be terminated to reduce the traffic load.

Figure 11A:
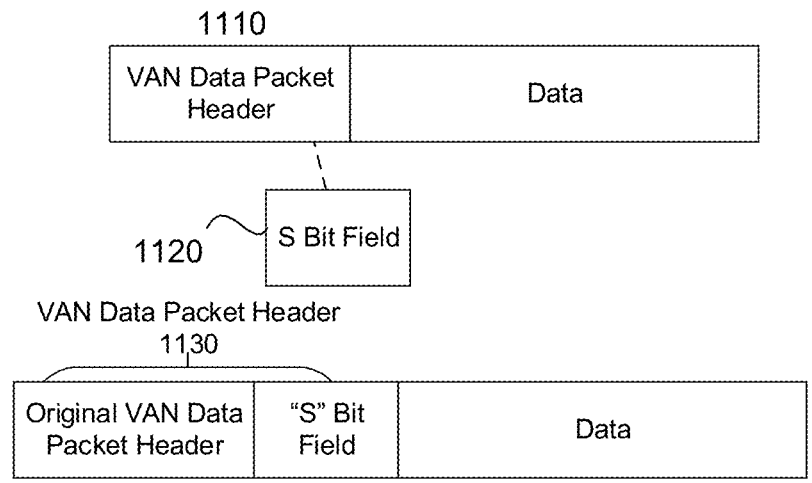
FIG. 11a illustrates a new S bit field being added to the VAN data packet header in accordance with an example.
Figure 11B:
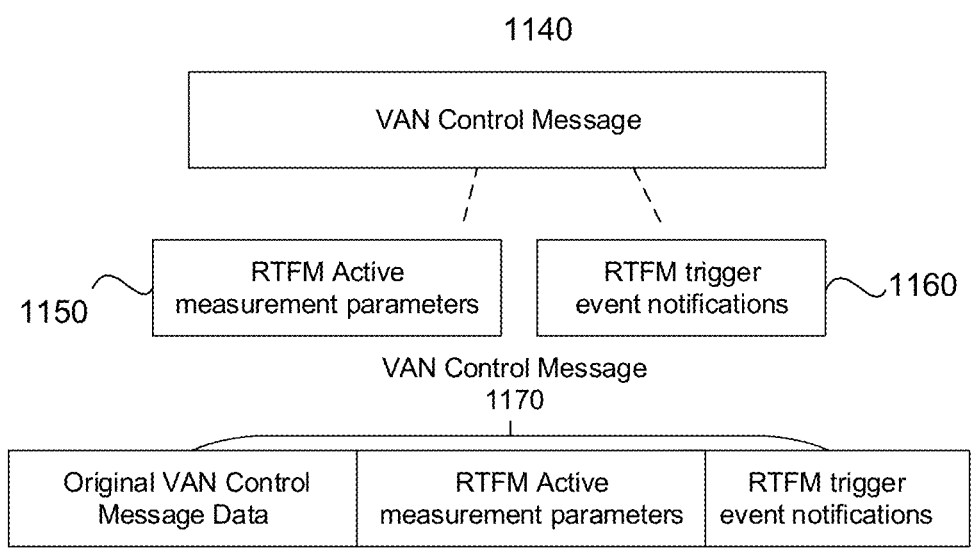
FIG. 11b illustrates RTFM active measurement parameters and RTFM trigger event notifications being added to the VAN control message in accordance with an example.

FIG. 11*a* illustrates one embodiment where a new bit field, S bit field 1120, is added to the VAN data packet header 1110. The S bit field 1120 indicates if the data packet(s) are to be sent over both networks. The S bit field 1120 may be added into a new or current VAN data packet header 1130. FIG. 11*b* illustrates one embodiment where RTFM active measurement parameters 1150 and RTFM trigger event notifications 1160 are added to the VAN control message 1140. The RTFM active measurement parameters 1150 and RTFM trigger event notifications 1160 may be added into a new or current VAN control message 1170. In one example the VAN control message 1140 may be incorporated into the Binding Update or Binding Acknowledgement of a Mobile IP. In another example the VAN control message may be a separate or a new message. In one embodiment, the RTFM active measurement parameters 1150 may include RTFM active measurement triggering parameters, such as a receive timeout event, a low throughput event, and/or a periodic timer expiry event and RTFM active measurement parameters, such as $C_{th}$ and $T_{th}$. In another embodiment, the RTFM trigger event notifications 1160 may include a notification that the RTFM active measurement is triggered or that the RTFM active measurement execution is triggered.

Figure 12:
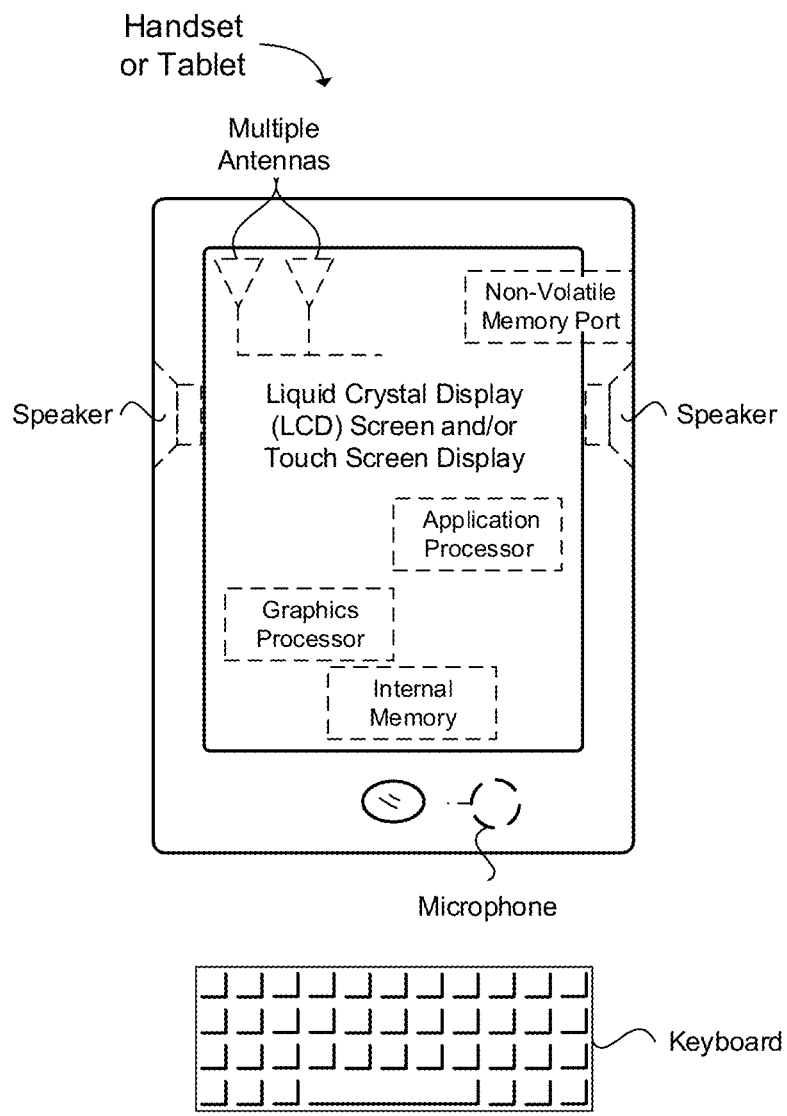
FIG. 12 illustrates a diagram of a user equipment (UE) in accordance with an example in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A mobile node for measuring link performance using multiple radio access networks (RAN), having computer circuitry configured to:
   receive data packets of a flow at the mobile node via a first connection with the mobile node with a first RAN;
   initiate an active measurement when a Real-time Traffic Flow Measurement (RTFM) triggering condition occurs;
   form a second connection with the mobile node with a second RAN;
   receive selected packets of the flow for the active measurement using the first RAN and the selected packets of the flow using the second RAN; and communicate an RTFM execution event to a virtual access network (VAN) to move the flow from the first RAN to the second RAN when the active measurement of the selected packets received via the second RAN is greater than a selected threshold value, wherein the RTFM execution event is determined by at least iteratively increasing a packet counter for each packet received from the second RAN before the receipt of the packet from the first RAN.

2. The computer circuitry of claim 1, wherein the computer circuitry is further configured to continue communicating the flow on the first RAN when the active measurement is less than the selected threshold value.

3. The computer circuitry of claim 1, wherein the RTFM triggering conditions include:
   non-receipt of packets of the flow from the first RAN within a defined threshold of time;
   an average receiving throughput of the flow of the first RAN is lower than a defined throughput threshold;
   an expiration of a defined period of time; or
   a packet loss of a flow from the first RAN that is greater than a defined threshold.

4. The computer circuitry of claim 1, wherein the RTFM execution event is determined by iteratively decreasing the packet counter for each packet received from the first RAN before the receipt of the packet from the second RAN.

5. The computer circuitry of claim 1, wherein the data packets of the flow from the first RAN include a bit field to indicate that the computer circuitry will receive packets from the first RAN and the second RAN for the active measurement.

6. The computer circuitry of claim 5, wherein the bit field is added to a packet header to indicate if a data packet was received over both the connection with the first RAN and the connection with the second RAN.

7. The computer circuitry of claim 1, wherein the computer circuitry is further configured to send a control message to the VAN server including:
   RTFM active measurement parameters; and
   RTFM trigger event notifications.

8. The computer circuitry of claim 1, wherein the computer circuitry is further configured to send a control message to the VAN server that is incorporated into a virtual access network.

9. The computer circuitry of claim 1, wherein the computer circuitry is further configured to determine when to begin an active measurement based on RTFM triggering conditions.

10. The computer circuitry of claim 1, wherein the computer circuitry is further configured to determine if an RTFM execution event has been triggered based on:
    the arrival time of the packets from the first RAN and the second RAN;
    the delay between the arrival of each packet from the first RAN and the delay between the arrival of each packet from the second RAN; or
    the number of packets received over a period of time.

11. The computer circuitry of claim 1, wherein the mobile node further comprises a virtual access server, a wireless fidelity (Wi-Fi) station, or a third generation partnership project (3GPP) long term evolution (LTE) radio, Release 8, 9, 10 or 11.

12. A virtual access network (VAN) server for measuring link performance using multiple radio access networks (RAN), having computer circuitry configured to:
    communicate data packets to a mobile node using a first RAN;
    receive a first control message from the mobile node to send selected data packets using the first RAN and send the selected packets using a second RAN when a Real-time Traffic Flow Measurement (RTFM) triggering condition occurs;
    communicate, to the mobile node, the selected packets using the first RAN and the selected packets using the second RAN; and
    receive a second control message to communicate data packets using the second RAN when an active measurement is greater than a selected threshold value, wherein the second control message is determined by at least iteratively increasing a packet counter for each packet received from the second RAN before the receipt of the selected packets from the first RAN.

13. The computer circuitry of claim 12, wherein the computer circuitry is further configured to continue communicating data packets using the first RAN when the active measurement is less than the selected threshold value.

14. The computer circuitry of claim 12, wherein the computer circuitry is further configured to select data packets communicated using the first RAN and select data packets communicated using the second RAN based on an intra-flow priority.

15. The computer circuitry of claim 12, wherein the computer circuitry is further configured to determine the intra-flow priority based on the priority of a first data packet communicated using the first RAN relative to the priority of a second data packet communicated using the first RAN.

16. The computer circuitry of claim 12, wherein the computer circuitry is further configured to determine the intra-flow priority based on the priority of a first data packet communicated using the second RAN relative to the priority of a second data packet communicated using the second RAN.

17. The computer circuitry of claim 12, wherein the first control message includes:
    RTFM active measurement parameters; and
    RTFM trigger event notifications.

18. The computer circuitry of claim 17, wherein the RTFM active measurement parameters include:
    non-receipt of packets communicated using the first RAN within a defined threshold of time;
    an average receiving throughput of packets communicated using the first RAN is lower than a defined throughput threshold;
    an expiration of a defined period of time; or
    a packet loss of packets communicated using the first RAN that is greater than a defined threshold.

19. The computer circuitry of claim 12, wherein the second control message includes:
    RTFM active measurement parameters; and
    RTFM trigger event notifications.

20. The computer circuitry of claim 19, wherein the RTFM active measurement parameters include:
    non-receipt of packets communicated using the first RAN within a defined threshold of time;
    an average receiving throughput of packets communicated using the first RAN is lower than a defined throughput threshold;
    an expiration of a defined period of time; or
    a packet loss of packets communicated using the first RAN that is greater than a defined threshold.

21. The computer circuitry of claim 12, wherein the computer circuitry is further configured for use with downlink or uplink communications.

22. The computer circuitry of claim 12, wherein the data packets include an additional bit field in a data packet header.

23. The computer circuitry of claim 22, wherein the additional bit field indicates when each data packet has been be sent using the first RAN and the second RAN.

24. A method for measuring link performance using multiple radio access n (RAN), comprising:
- communicating data packets to a mobile node using a first RAN;
- receiving a first control message to send selected data packets using the first RAN and send the selected packets using the second RAN when a Real-time Traffic Flow Measurement (RTFM) triggering condition occurs;
- communicating selected packets of the flow using the first RAN and the selected packets of the flow using the second RAN to the mobile node; and
- receiving a second control message to move the flow from the first RAN to the second RAN when an active measurement is greater than a selected threshold value, wherein the second control message is determined by at least iteratively increasing a packet counter for each packet received from the second RAN before the receipt of the selected packets from the first RAN.

25. The method of claim 24, further comprising continuing communicating data packets using the first RAN when the active measurement is less than the selected threshold value.

26. The method of claim 24, further comprising communicating the selected data packets to the mobile node using the first RAN and the second RAN from a virtual access server or an enhanced Node B (eNB).

27. The method of claim 24, further comprising communicating selected high priority packets of the flow using the first RAN and the selected high priority packets of the flow using the second RAN to the mobile node.

28. The method of claim 24, further comprising terminating communicated selected low priority packets of the flow using the first RAN and the selected low priority packets of the flow using the second RAN to the mobile node.

29. The method of claim 28, wherein the data packet priority of the flow from the first RAN and the data packet priority of the flow from the second RAN are selected based on an intra-flow priority.

30. The method of claim 28, wherein the selected low priority packets of the flow using the first RAN and the selected low priority packets of the flow using the second RAN are terminated to reduce the traffic load.

* * * * *